United States Patent
Chandwadkar et al.

(10) Patent No.: US 7,340,744 B2
(45) Date of Patent: Mar. 4, 2008

(54) SYSTEM AND METHOD FOR OPTIMIZING SESSIONS AND NETWORK RESOURCES IN A LOADBALANCING ENVIRONMENT

(75) Inventors: Ashish A. Chandwadkar, Morrisville, NC (US); Chris O'Rourke, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 322 days.

(21) Appl. No.: 11/102,416

(22) Filed: Apr. 8, 2005

(65) Prior Publication Data

US 2006/0227705 A1 Oct. 12, 2006

(51) Int. Cl.
*G06F 9/46* (2006.01)
*G06F 15/16* (2006.01)

(52) U.S. Cl. .................... 718/105; 709/226
(58) Field of Classification Search ............. 718/105; 709/226, 206
See application file for complete search history.

(56) References Cited

U.S. PATENT DOCUMENTS

| | | | |
|---|---|---|---|
| 5,602,907 A | 2/1997 | Hata et al. ............. | 379/114 |
| 5,774,660 A | 6/1998 | Brendel et al. ....... | 395/200.31 |
| 5,822,411 A | 10/1998 | Swale et al. .......... | 379/111 |
| 5,828,737 A | 10/1998 | Sawyer ................ | 379/114 |
| 5,905,736 A | 5/1999 | Ronen et al. ......... | 370/546 |
| 5,909,238 A | 6/1999 | Nagashima et al. ...... | 348/3 |
| 5,946,670 A | 8/1999 | Motohashi et al. ...... | 705/400 |
| 5,951,694 A * | 9/1999 | Choquier et al. ....... | 714/15 |
| 5,956,391 A | 9/1999 | Melen et al. .......... | 379/114 |
| 5,970,477 A | 10/1999 | Roden ................ | 705/32 |
| 5,987,498 A | 11/1999 | Athing et al. ........ | 709/203 |
| 6,006,264 A * | 12/1999 | Colby et al. .......... | 709/226 |
| 6,016,305 A | 1/2000 | Borst et al. .......... | 370/234 |
| 6,016,509 A | 1/2000 | Dedrick .............. | 709/224 |
| 6,035,281 A | 3/2000 | Crosskey et al. ....... | 705/14 |
| 6,047,051 A | 4/2000 | Ginzboorg et al. ..... | 379/130 |
| 6,070,192 A | 5/2000 | Holt et al. ............ | 709/227 |
| 6,075,854 A | 6/2000 | Copley et al. ......... | 379/211 |

(Continued)

FOREIGN PATENT DOCUMENTS

WO WO 98/26381 12/1997

(Continued)

OTHER PUBLICATIONS

Information Sciences Institute, "Internet Protocol, Darpa Internet Program Protocol Specification," Univ. of Southern Califorinia, 49 pgs., Sep. 1981.

(Continued)

*Primary Examiner*—Meng-Al T. An
*Assistant Examiner*—Camquy Truong
(74) *Attorney, Agent, or Firm*—Baker Botts L.L.P.

(57) ABSTRACT

A method for loadbalancing in a network environment is provided that includes receiving a create request from an end user for a communications link provided by a network node and communicating a response to the end user in order to establish a communication session. The method further includes identifying a selected one of a plurality of network nodes to facilitate the communication session. The identification of the selected network node is achieved through binding of a session identifier associated with the end user to the selected network node.

14 Claims, 3 Drawing Sheets

U.S. PATENT DOCUMENTS

| | | | | |
|---|---|---|---|---|
| 6,128,642 | A | 10/2000 | Doraswamy et al. | 709/201 |
| 6,128,657 | A | 10/2000 | Okanoya et al. | 709/224 |
| 6,131,024 | A | 10/2000 | Boltz | 455/405 |
| 6,137,777 | A | 10/2000 | Vaid et al. | 370/230 |
| 6,141,684 | A | 10/2000 | McDonald et al. | 709/222 |
| 6,175,879 | B1 | 1/2001 | Shah et al. | 709/330 |
| 6,185,619 | B1* | 2/2001 | Joffe et al. | 709/229 |
| 6,201,962 | B1 | 3/2001 | Sturniolo et al. | 455/432 |
| 6,208,977 | B1 | 3/2001 | Hernandez et al. | 705/34 |
| 6,230,012 | B1 | 5/2001 | Willkie et al. | 455/435 |
| 6,249,801 | B1 | 6/2001 | Zisapel et al. | 709/105 |
| 6,263,368 | B1 | 7/2001 | Martin | 709/224 |
| 6,282,573 | B1 | 8/2001 | Darago et al. | 709/229 |
| 6,295,447 | B1 | 9/2001 | Reichelt et al. | 455/417 |
| 6,298,383 | B1 | 10/2001 | Gutman et al. | 709/229 |
| 6,327,622 | B1* | 12/2001 | Jindal et al. | 709/228 |
| 6,330,602 | B1 | 12/2001 | Law et al. | 709/224 |
| 6,377,571 | B1 | 4/2002 | Tai | 370/355 |
| 6,377,982 | B1 | 4/2002 | Rai et al. | 709/217 |
| 6,393,458 | B1 | 5/2002 | Gigliotti et al. | 709/203 |
| 6,393,482 | B1 | 5/2002 | Rai et al. | 709/225 |
| 6,400,722 | B1 | 6/2002 | Chuah et al. | 370/401 |
| 6,414,950 | B1 | 7/2002 | Rai et al. | 370/338 |
| 6,421,714 | B1 | 7/2002 | Rai et al. | 709/217 |
| 6,434,618 | B1 | 8/2002 | Cohen et al. | 709/228 |
| 6,442,165 | B1 | 8/2002 | Sitaraman et al. | 370/395.4 |
| 6,466,571 | B1 | 10/2002 | Dynarski et al. | 370/352 |
| 6,473,802 | B2 | 10/2002 | Masters | 709/229 |
| 6,480,485 | B1 | 11/2002 | Kari et al. | 370/352 |
| 6,484,143 | B1 | 11/2002 | Swildens et al. | 705/1 |
| 6,512,754 | B2 | 1/2003 | Feder et al. | 370/338 |
| 6,529,501 | B1 | 3/2003 | Zhao et al. | 370/353 |
| 6,611,821 | B2 | 8/2003 | Stahl et al. | 705/400 |
| 6,665,537 | B1 | 12/2003 | Lioy | 455/435 |
| 6,671,675 | B2 | 12/2003 | Iwamura | 705/30 |
| 6,728,266 | B1 | 4/2004 | Sabry et al. | 370/468 |
| 6,757,371 | B2 | 6/2004 | Kim et al. | 379/114.22 |
| 2001/0023428 | A1 | 9/2001 | Miyazaki et al. | 709/201 |
| 2002/0059114 | A1 | 5/2002 | Cockrill et al. | 705/27 |
| 2002/0138601 | A1 | 9/2002 | Piponius et al. | 709/223 |
| 2003/0076803 | A1* | 4/2003 | Chuah | 370/338 |
| 2003/0169771 | A1* | 9/2003 | Ahn et al. | 370/497 |

FOREIGN PATENT DOCUMENTS

WO    WO 99/31610    6/1999

OTHER PUBLICATIONS

S. Deering, "Host Extensions for IP Multicasting," Stanford University, 17 pgs., Aug. 1989.

* cited by examiner

| STEP 1<br>PRIMARY CREATE PDP REQUEST WITH NSAPI = 7,<br>SESSION 5 TUPLE: ||||||
|---|---|---|---|---|---|
| CLIENT ADDRESS<br>Y.Y.Y.Y | CLIENT PORT<br>2123 | SERVER ADDRESS<br>Z.Z.Z.Z | | SERVER PORT<br>2123 | KEY=<br>1112233333333373 |
| VSERVER | KEY || CLIENT | REAL ||
| Z.Z.Z.Z | 1112233333333373 || Y.Y.Y.Y | A.A.A.A ||
| STEP 2<br>PRIMARY CREATE PDP REQUEST WITH NSAPI = 9<br>SESSION 5 TUPLE: ||||||
| CLIENT ADDRESS<br>Y.Y.Y.Y | CLIENT PORT<br>2123 | SERVER ADDRESS<br>Z.Z.Z.Z | | SERVER PORT<br>2123 | KEY=<br>1112233333333393 |
| VSERVER | KEY || CLIENT | REAL ||
| Z.Z.Z.Z<br>Z.Z.Z.Z | 1112233333333373<br>1112233333333393 || Y.Y.Y.Y<br>Y.Y.Y.Y | A.A.A.A<br>B.B.B.B ||
| STEP 3<br>PRIMARY CREATE PDP REQUEST WITH NSAPI = 11<br>SESSION 5 TUPLE: ||||||
| CLIENT ADDRESS<br>Y.Y.Y.Y | CLIENT PORT<br>2123 | SERVER ADDRESS<br>Z.Z.Z.Z | | SERVER PORT<br>2123 | KEY=<br>1112233333333393 |
| VSERVER | KEY || CLIENT | REAL ||
| Z.Z.Z.Z<br>Z.Z.Z.Z<br>Z.Z.Z.Z | 1112233333333373<br>1112233333333393<br>11122333333333B3 || Y.Y.Y.Y<br>Y.Y.Y.Y<br>Y.Y.Y.Y | A.A.A.A<br>B.B.B.B<br>C.C.C.C ||
| STEP 4<br>DELETE PDP REQUEST WITH NSAPI = 7 ||||||
| VSERVER | KEY || CLIENT | REAL ||
| Z.Z.Z.Z<br>Z.Z.Z.Z | 1112233333333393<br>11122333333333B3 || Y.Y.Y.Y<br>Y.Y.Y.Y | B.B.B.B<br>C.C.C.C ||

*FIG. 3A*

| STEP 1 |||| 
| PRIMARY CREATE PDP REQUEST WITH NSAPI = 7 ||||
| IMSI | REAL | REFCOUNT | NSAPI |
| --- | --- | --- | --- |
| 11122333333333F3 | A.A.A.A | 1 | 7 |
| STEP 2 ||||
| PRIMARY CREATE PDP REQUEST WITH NSAPI = 9 ||||
| IMSI | REAL | REFCOUNT | NSAPI |
| 11122333333333F3 | A.A.A.A | 2 | 7,9 |
| STEP 3 ||||
| PRIMARY CREATE PDP REQUEST WITH NSAPI = 11 ||||
| IMSI | REAL | REFCOUNT | NSAPI |
| 11122333333333F3 | A.A.A.A | 3 | 7,9,11 |
| STEP 4 ||||
| DELETE PDP REQUEST WITH NSAPI = 7. REFCOUNT IS DECREMENTED ||||
| IMSI | REAL | REFCOUNT | NSAPI |
| 11122333333333F3 | A.A.A.A | 2 | 9,11 |

*FIG. 3B*

SYSTEM AND METHOD FOR OPTIMIZING SESSIONS AND NETWORK RESOURCES IN A LOADBALANCING ENVIRONMENT

TECHNICAL FIELD OF THE INVENTION

This invention relates in general to the field of communications, and, more particularly, to a system and a method for avoiding stale sessions on a server in a loadbalancing environment.

BACKGROUND OF THE INVENTION

Networking architectures have grown increasingly complex in communications environments. In addition, the augmentation of clients or end users wishing to communicate in a network environment has caused many networking configurations and systems to respond by adding elements to accommodate the increase in networking traffic. Communication tunnels or links may be used in order to establish or to gain access to a network, whereby an end user or an object may initiate a tunneling protocol by invoking a selected location or a network node. The network node or central location may then provide a platform that the end user may use to conduct a communication session.

As the subscriber base of end users increases, proper routing and efficient management of communication sessions and data flows becomes even more critical. Having access to, or being aware of, accurate network node activity is important for executing proper loadbalancing techniques. In cases where improper loadbalancing protocols are executed, certain network components may be overwhelmed, while other (potentially more capable) network resources remain untapped. This overburdening may decrease throughput and unnecessarily restrict the flow of network traffic (potentially causing congestion or bottlenecks in the system).

Additionally, stale sessions, which are generally prevalent in any network communications, may be problematic because they inhibit bandwidth capabilities and preclude additional communications tunnels or end users from being accommodated by a given architecture. Stale sessions may be a problem for a database, a table, or any other storage component relegated the task of accounting for a resource-consuming entity. Stale sessions create an inefficiency because network components may still continue to maintain certain data segments even though the corresponding network activity has ceased. The network activity (e.g. connections or channels), which initially required, spawned, or otherwise triggered these resources, is no longer occurring and, thus, their network resources should be liberated or their responsibilities should be relinquished such that they can be deployed for additional connections and channels.

Thus, designing an optimal loadbalancing configuration for any network architecture provides a significant challenge to component manufacturers, system administrators, and network operators.

SUMMARY OF THE INVENTION

From the foregoing, it may be appreciated by those skilled in the art that a need has arisen for an improved communications approach that provides for optimal loadbalancing between two end points or nodes. In accordance with one embodiment of the present invention, a system and a method for loadbalancing in a network environment are provided that greatly reduce disadvantages and problems associated with conventional loadbalancing techniques.

According to one embodiment of the present invention, a method for loadbalancing in a network environment is provided that includes receiving a create request from an end user for a communications link provided by a network node and communicating a response to the end user in order to establish a communication session. The method further includes identifying a selected one of a plurality of network nodes to facilitate the communication session. The identification of the selected network node is achieved through binding of a session identifier associated with the end user to the selected network node.

Certain embodiments of the present invention may provide a number of technical advantages. For example, according to one embodiment of the present invention a communications approach is provided that allows a loadbalancer to more properly distribute work to multiple network nodes. This is a result of a loadbalancer that can optimally appropriate usage of network resource (IP address pools, gateway memory), consistently route user data to its proper connection, and systematically avoid double-billing scenarios.

The present invention can offer a tighter coupling between the GGSN and the PDP create requests: such a coupling being achieved through the loadbalancer. This, in turn, yields a significant efficiency in utilizing network resources. Moreover, by localizing an end user to a given GGSN, the present invention offers enhanced control for manipulating the end user's experience and resources.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1:
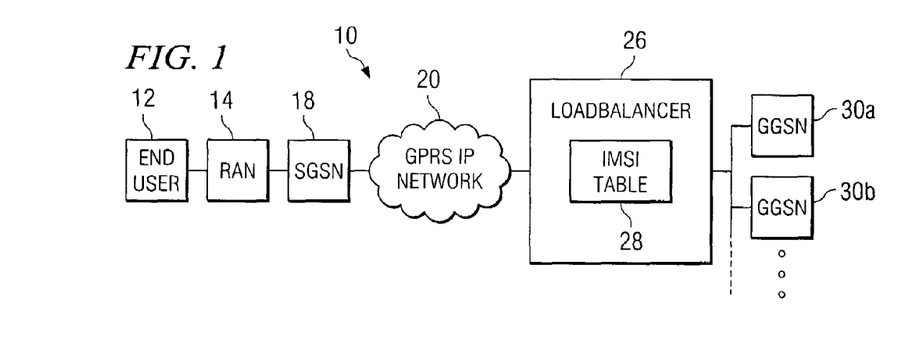
FIG. 1 is a simplified block diagram of a communications system for loadbalancing in a network environment in accordance with one embodiment of the present invention.

FIG. 1 is a simplified block diagram of a communication system 10 for communicating data in a network environment. Communication system 10 includes an end user 12, a radio access network (RAN) 14, a serving general packet radio service (GPRS) support node (SGSN) 18, and GPRS internet protocol (IP) network 20. Additionally, communication system 10 may include a loadbalancer 26 (that may include an international mobile station identifier (IMSI) table 28) and multiple gateway GPRS support nodes (GGSNs) 30a-b. FIG. 1 may be generally configured or arranged to represent 2.5G communication architecture applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communication system 10. For example, communication system 10 may cooperate with any version of a GPRS tunneling protocol (GTP) that includes loadbalancing operations. This may be inclusive of first generation, 2G, and 3G architectures that provide features for workload distribution.

In accordance with the teachings of the present invention, communication system 10 provides a loadbalancing operation that offers optimal communications between end user 12 and selected GGSNs 30a-b. Loadbalancer 26 binds an end user's network access connection to a particular GGSN by building a sticky object, which is based on information present in the access protocol. This would, in turn, eliminate troublesome stale packet data protocol contexts (PDPs) or hanging PDPs. This enhancement (in adequately removing these unsatisfactory PDP elements) can be accomplished by parsing the GTP control stream and by building a persistent sticky object that can be stored in loadbalancer 26. Hence, stickying may be performed based on an access connection or on a PDP or a layer-2 tunnel connectivity coming in from the SGSN. In one respect, this achieves a stickying operation based on layer-2 information.

Note that, typically, loadbalancing is accomplished through a flow categorizing function that binds the layer-4 flow to the selected gateway. In the mechanism provided by loadbalancer 26, instead of using the layer-4 flow, loadbalancer 26 makes use of a user identifier (e.g. an IMSI or a mobile subscriber ISDN (MSISDN)) for binding purposes. Hence, loadbalancer 26 makes a loadbalancing decision for the very first session create request from the user and forwards subsequent create requests from the same user (same IMSI or MSISDN) to the same gateway. This also greatly reduces the amount of information that needs to be stored and searched within loadbalancer 26, thereby increasing the capacity of loadbalancer 26. To support multiple sessions from the same user (multiple primary PDPs from the same user in GPRS/UMTS world) loadbalancer 26 keeps track of the reference count ('refcount') on this binding. When the server deletes this session, it notifies loadbalancer 26 about it by sending an explicit message. Loadbalancer 26, in turn, decreases the refcount on the binding and eventually cleans it up if refcount becomes zero.

Note that such operations, which minimize consumption of resources in the network, would be particularly beneficial to oversubscribed scenarios where a hanging PDP would take a given IP address out of circulation. The present invention overcomes such a scenario by properly accounting for a hanging PDP such that network resources can be optimized. The present invention offers: improved capacity management in loadbalancer 26, optimal usage of network resources (IP address pools, gateway memory), consistent routing of user data, and a significant reduction in double-billing scenarios. The present invention can achieve a tighter coupling between the GGSN and the PDP create requests through loadbalancer 26. In addition, by localizing an end user to a given GGSN, the present invention offers enhanced control for manipulating the end user's experience and resources.

Note that for purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

In a clustered or loadbalancing environment, a stale user connection could cause problems such as misrouting of user data, double billing, inappropriate release of resources for an active connection, etc. This happens when the same session comes up on a server that is different from the server to which it was previously assigned. Consider, for example, a scenario involving a GPRS/UMTS network. A user (i.e. IMSI) can create multiple sessions identified by a network service access point identifier (NSAPI). When the GGSNs are deployed in a loadbalanced environment, assume a delete request is lost between the SGSN and GGSN so that the PDP becomes stale on the GGSN. Subsequently, if the same create request (same IMSI+NSAPI) comes to the loadbalancer, it loadbalances it afresh because it no longer has the user location information. This may cause the same PDP to exist on two or more GGSNs, which can cause misrouting of user data and inconsistencies in call detail records (CDRs) (e.g. S-CDRs and G-CDRs).

Problems could also occur because some RADIUS servers assign the same IP address to a user even if the session identifiers are different during the sticky time. In the GPRS/UMTS environment, if the second request arrives within the sticky time, it is generally assigned the same IP address even in cases where the NSAPI (and, thus, the TID) is different. If this session is assigned to a different GGSN, the request is fulfilled, but this could still lead to a problem of the old PDP (eventually) freeing up the IP address of the new one.

Hence, when a given loadbalancer makes a decision for an assignment of a PDP to a GGSN (within a GGSN cluster), current loadbalancing configurations make a different loadbalancing decision for each create request that is seen. Therefore, traffic for a given end user (or IMSI) could be spread across multiple GGSNs of the GGSN cluster. This could result in one device (e.g. a mobile station) occupying resources (memory, processing, etc.) from multiple GGSNs.

This presents a number of salient issues for the loadbalancer. For example, consider a case where a second PDP create request is seen by the loadbalancer, which then assigns the second PDP to a GGSN other than the GGSN assigned for the first PDP create. However (in this example), in between these two create messages, the end user may have timed out of a given session (e.g. the powered down his phone, the mobile station departed silently, the network lost or misrouted a delete request, etc.). Note that the loadbalancer is not maintaining state information and, therefore, the loadbalancer does not know the context for this second PDP create (e.g., the loadbalancer does not know if an end user is reconnecting). This could present a problem, for example, in that another IP address could be allocated for the end user. In such a case, multiple IP addresses could be removed from an IP address pool, whereby several GGSNs are consuming resources for only a single end user.

The root cause of the problems described above is that the loadbalancer makes a fresh load balancing decision for every new request from the user. To solve this problem, a mechanism is needed to make a loadbalancing decision only once for a subscriber and, thereafter, stick to it by forwarding all subsequent create requests from the same subscriber to the GGSN selected.

In order to resolve these issues (and others), loadbalancer 26 provides a protocol that can identify the device making the PDP create request and, based on that information, deliver data associated with this PDP create request to the same GGSN. This may occur until such time that the GGSN provides feedback to loadbalancer 26 and indicates that the user is truly logged off the network (i.e. the GGSN has given up its resources for this end user).

Note that the concept of building a sticky object to bind a user to a loadbalanced device is not new. Loadbalancers in the market today build sticky object based on layer-3 information (user IP address), or application information, such as HTTP cookies. In contrast to these operations, loadbalancer 26 is operable to create an object (e.g. an IMSI sticky), in order to create a persistent binding between the IMSI and the actual GGSN servicing that IMSI. In essence, the more tightly coupled the loadbalancer is to the GGSN, the better the performance of the system. The present invention can localize an end user to a given GGSN. Additional details relating to these binding operations are provided below with reference to corresponding FIGURES.

Turning now to the infrastructure of FIG. 1, end user 12 is a client or a customer wishing to initiate a communication in communication system 10 via GPRS IP network 20. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

RAN 14 is a communications interface between end user 12 and SGSN 18. RAN 14 may comprise a base transceiver station and a base station controller. The communications interface provided by RAN 14 offers connectivity and allows data to be exchanged between end user 12 and any number of selected elements within communication system 10. RAN 14 facilitates the delivery of a request packet generated by end user 12 and the reception of information sought by end user 12. RAN 14 is only one example of a communications interface between end user 12 and SGSN 18. Other types of communications interfaces may be used for a desired network design based on particular needs.

GPRS IP network 20 represents a series of points or nodes of interconnected communication paths for receiving and transmitting packets of information that propagate through communication system 10. GPRS IP network 20 offers a communicative interface between end user 12 and selected GGSNs 30*a-b* and may be any local area network (LAN), wireless local area network (WLAN), metropolitan area network (MAN), wide area network (WAN), virtual private network (VPN), or any other appropriate architecture or system that facilitates communications in a network environment. GPRS IP network 20 implements a user datagram protocol (UDP)/internet protocol (UDP/IP) communication language protocol in a particular embodiment of the present invention. However, GPRS IP network 20 may alternatively implement any other suitable communication protocol for transmitting and receiving data or information within communication system 10.

SGSN 18 and GGSNs 30*a-b* are network elements that cooperate in order to facilitate a communication session involving end user 12. GGSNs 30*a-b* are communications or network nodes that may be working in conjunction with multiple SGSNs 18 to provide a communications medium in a GPRS service network environment in communicating data exchanges within communication system 10. GPRS represents a packet-based data bearer service for communication services that may be delivered as a network overlay for any type of suitable network configuration or platform. GPRS generally applies packet-radio and packet switching principles to transfer data packets in an efficient way between GSM elements or units and external packet data networks. GPRS may support multiple internet communication protocols and may enable existing IP, X.25, or any other suitable applications or platforms to operate over GSM connections.

Loadbalancer 26 is an element or a device that receives requests and then distributes those requests to the next available server or node. The available server or node may be any computer or device on a network that manages network resources or that processes data. For example, the network node may be a selected GGSN 30*a-b* or a selected network access server (NAS). Such loadbalancing decisions may be executed based on suitable algorithms, software, or hardware provided in loadbalancer 26.

Loadbalancer 26 may also perform other suitable load-balancing tasks, such as dividing the amount of work that an element has to do between two or more elements to ensure more work gets done in the same amount of time and, in general, accommodating end users 12 more quickly. The term 'loadbalancer' encompasses any suitable network element such as a router, a switch, a bridge, a gateway, a server, or any other suitable element, component, device, or object operable to facilitate data reception or transmission in a network environment. Additionally, loadbalancer 26 and/or GGSNs 30*a-b* may include any appropriate hardware, software, (or a combination of both) or any appropriate component, device, element, or object that suitably assists or facilitates the operations described herein. In certain embodiments, GGSNs 30*a-b* may be equipped with elements that allow them to provide feedback to loadbalancer 26. In a similar vein, loadbalancer 26 may be equipped with elements that can receive and process such feedback information.

In operation of an example embodiment, loadbalancer 26 may execute loadbalancing decisions for selected GGSNs 30*a-b*. Inbound and outbound signaling traffic to and from SGSN 18 and GGSNs 30*a-b* may flow through loadbalancer 26 (in whole or in part). Loadbalancer 26 may filter the traffic using any appropriate criterion, such as source IP address, destination IP address, source port, destination port, protocol tuple, or any other suitable parameter or characteristic. Filtering may be implemented to inspect all signaling traffic to and from SGSN 18 and selected GGSNs 30*a-b* (that may be co-located in a GGSN farm or cluster). Loadbalancer 26 may initially create a session on the first (primary) create request and 'sticky' the identifier (e.g. IMSI) to the selected GGSN. A session may be identified by the client (SGSN) IP address and port, server (GGSN) IP address and port, protocol and session key, or any other suitable parameters where appropriate. For GTP version one, loadbalancer 26 may create a session per tunnel end point identifier (TEID) and, thus, a session on loadbalancer 26 may identify all PDP contexts (one primary and several secondary) with the same PDP address and access point name (APN) combination.

Figure 2:
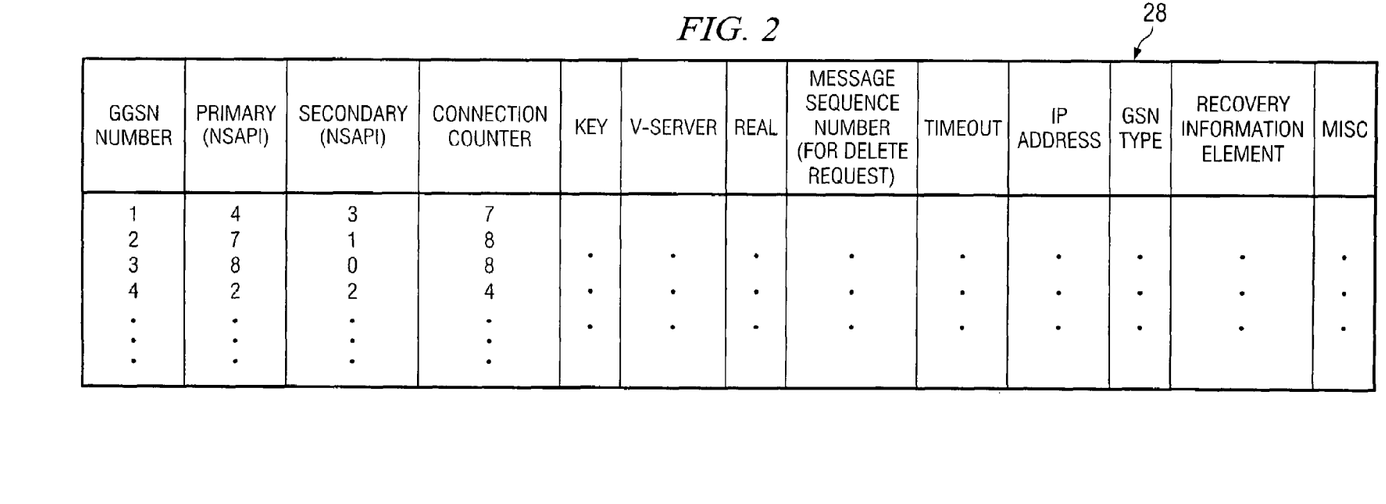
FIG. 2 is a simplified block diagram of a table that may be included within a loadbalancer that is provisioned in the communication system.

FIG. 2 is a simplified block diagram of a table 28 in accordance with one embodiment of the present invention. Table 28 may be provided internal to loadbalancer 26 or provided external to loadbalancer 26 and suitably coupled thereto. In one example, table 28 is an IMSI table, as is illustrated in the example of FIG. 2. However, in other embodiments, table 28 could be any storage element that is operable to include one or more identifying elements, which would assist in the routing of flows to their appropriate GGSN, as outlined herein.

Table 28 may include any suitable software, hardware, algorithms, or other suitable elements to effectuate its operations. Table 28 may also include any suitable information associated with session objects, allocations made for each GGSN 30a-b, or other networking data in accordance with particular needs. Table 28 may include a primary NSAPI column, a secondary NSAPI column, a connection counter, an IP address column, a GSN type column, a recovery information element (I.E.) column, a message sequence number, and a timer column. Table 28 may also include a row for session 5 tuple parameters, including: the client address, the client port, the server address, the server port, and a key. Table 28 may also include a column for a v-server, which corresponds to a virtual GGSN address that is used to represent a cluster of GGSNs for the network. Within the GPRS header, there is a tunnel endpoint identifier (TEID), which is represented as the key in table 28. The "client" (e.g. Y.Y.Y.Y) is the IP address of the SGSN. In addition, the "real" is the assigned GGSN of the cluster.

Note that a session object generally represents a communication tunnel or link. A suitable element may be provided internally to table 28 (or in cooperation therewith) that tracks the number of open PDP contexts for a given tunnel. In this example, the NSAPI may be provided to identify and record the number of open PDP contexts per tunnel. As loadbalancer 26 snoops or gleans information associated with secondary creates, this information may be taken into account when making a loadbalancing decision. Accordingly, a loadbalancing decision may be based on the total number of PDP contexts associated with a given GGSN 30a-b. Table 28 may monitor the number of open tunnels and the number of open PDP contexts associated with these tunnels. Table 28 may comprise session objects and NSAPI objects, which reflect a number corresponding to the secondary PDP contexts. For example, a given tunnel may have sixteen NSAPIs.

The NSAPI may also identify the application being used by end user 12 (e.g. image session, web browser session, etc.). For example, voice over IP may require a higher quality of service than web traffic. Thus, a secondary PDP with a different NSAPI number may be provided that corresponds to a higher level of service for the voice over IP. Other data may simply traverse the other PDP provided. As used herein this document, 'PDP' connotes the relationship between end user 12 and a corresponding network node. Each PDP may additionally include information associated with quality of service or policy routing considerations, where such is appropriate. When an IP address is needed, a PDP context may need to be established. Each PDP context may be associated with an NSAPI, and each NSAPI may map to one primary or secondary PDP context. There are generally four bits allocated for NSAPIs with values of zero-four being reserved.

Note that such columns or categories of information are not exhaustive and may certainly be added to or modified significantly. The categories of information have been provided for purposes of example only and should be construed as such. Table 28 may be used in order to time responses to messages from selected GGSNs in communication system 10. Table 28 may be suitably created or updated by loadbalancer 26 or appropriately configured or designed in accordance with particular needs.

Figure 3A:
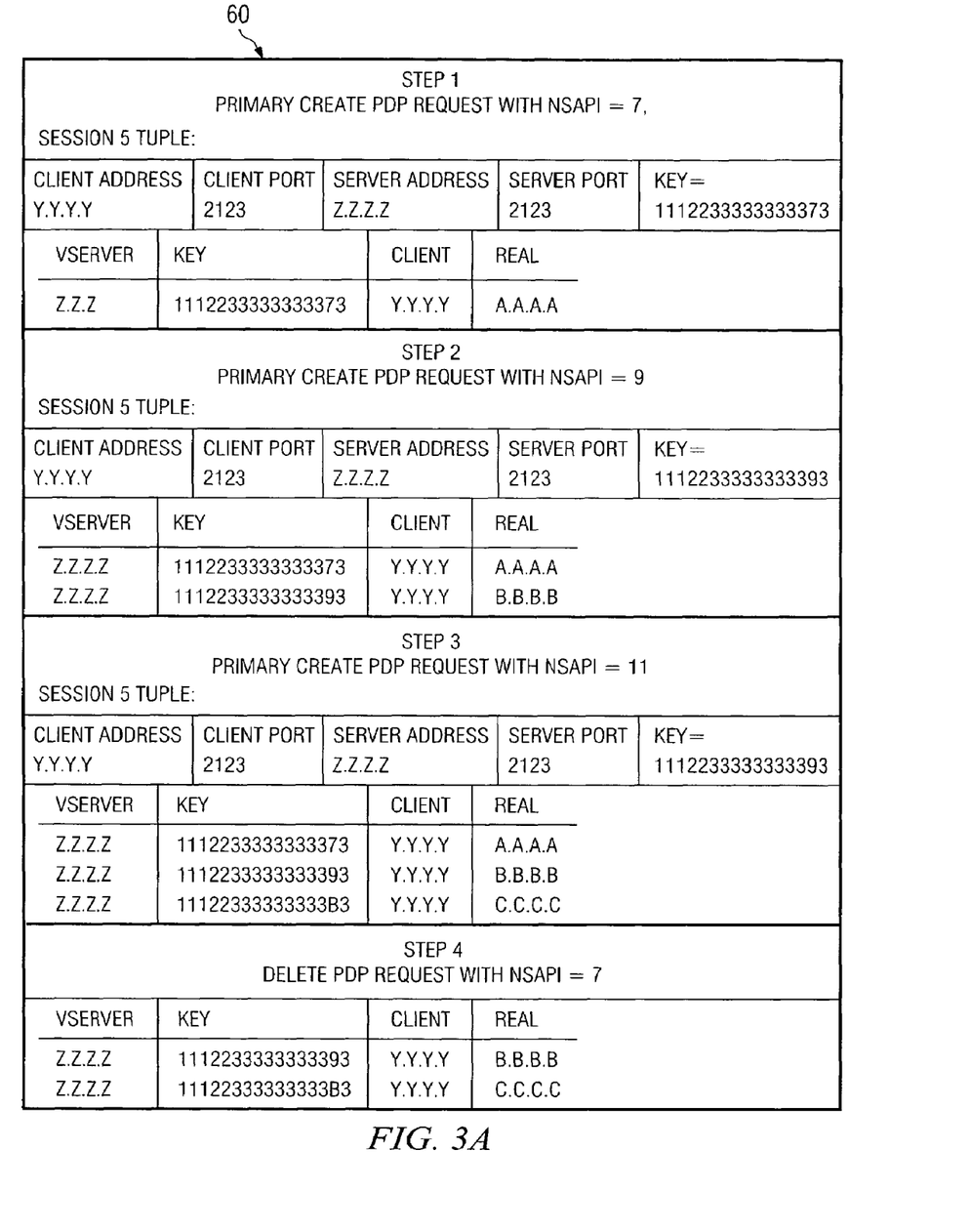
FIG. 3A is a simplified timing diagram of an example session table.

FIG. 3A is a simplified timing diagram illustrating an example interaction between conventional elements within a loadbalancing system. FIG. 3A illustrates how a given session table 60 in a loadbalancer would look without the teachings of the present invention. In this example, session table 60 includes a row for session 5 tuple parameters, including the client address, the client port, the server address, the server port, and a key. Session table 60 also includes a column for a v-server, which is the virtual GGSN address that is used to represent a cluster of GGSNs to the network. In the GPRS header, there is the TEID, which is represented as the key in session table 60. The client in this example (e.g. Y.Y.Y.Y) is the IP address of the SGSN. In addition, the real (e.g. A.A.A.A) is the assigned GGSN of the cluster.

In previous loadbalancing scenarios, a loadbalancer would loadbalance the PDP create messages for the GGSN. Multiple creates are reflected in Steps 1, 2, and 3 such that the end user is effectively distributed over multiple GGSNs. The issue is that multiple primary PDP create messages can have different NSAPIs. Hence, the primary PDP creates could be loadbalanced to different GGSNs and the loadbalancer is somewhat oblivious to the state of the network. In this example scenario, the loadbalancing decision is based on session 5 tuple data that includes: the client address, the client port, the server address, the server port, and the session key, where the tunnel identifier=IMSI+NSAPI.

Step 1 reflects a primary create PDP request with an NSAPI equal to 7. The corresponding session 5 tuple is also provided. When the session lookup fails, a new entry is created and a fresh loadbalancing decision is made. Step 2 reflects another primary create PDP request with an NSAPI of 9. Again, the session 5 tuple is illustrated in session table 60. In this case, the session lookup fails, a new entry is again created, and a fresh loadbalancing decision is made.

Note that in Steps 1 and 2, there are two create requests coming in from the same client or subscriber. The key in these instances is composed of the IMSI and the NSAPI. Note also that the loadbalancer is (incorrectly) assigning these requests to different real server IP addresses.

Step 3 reflects yet another primary create PDP request with an NSAPI of 11. In this case, the session lookup failed and a new entry is created. A fresh loadbalancing decision is also made. Note that, at this point, the first PDP create may have already disappeared (e.g. gone through a tunnel and gone away silently). But the loadbalancer cannot recognize this condition. This results in an inefficient scenario where the end user's activity is across multiple GGSNs. At Step 4, a delete PDP request is generated having an NSAPI=7. The delete request is operable to clear NSAPI 7 (i.e. the A.A.A.A assignment) from session table 60. Such a delete request is not necessarily recognized by the loadbalancer such that it responds by freeing up resources for this particular end user. The delete request may be lost or simply unaccounted for by the loadbalancer.

Figure 3B:
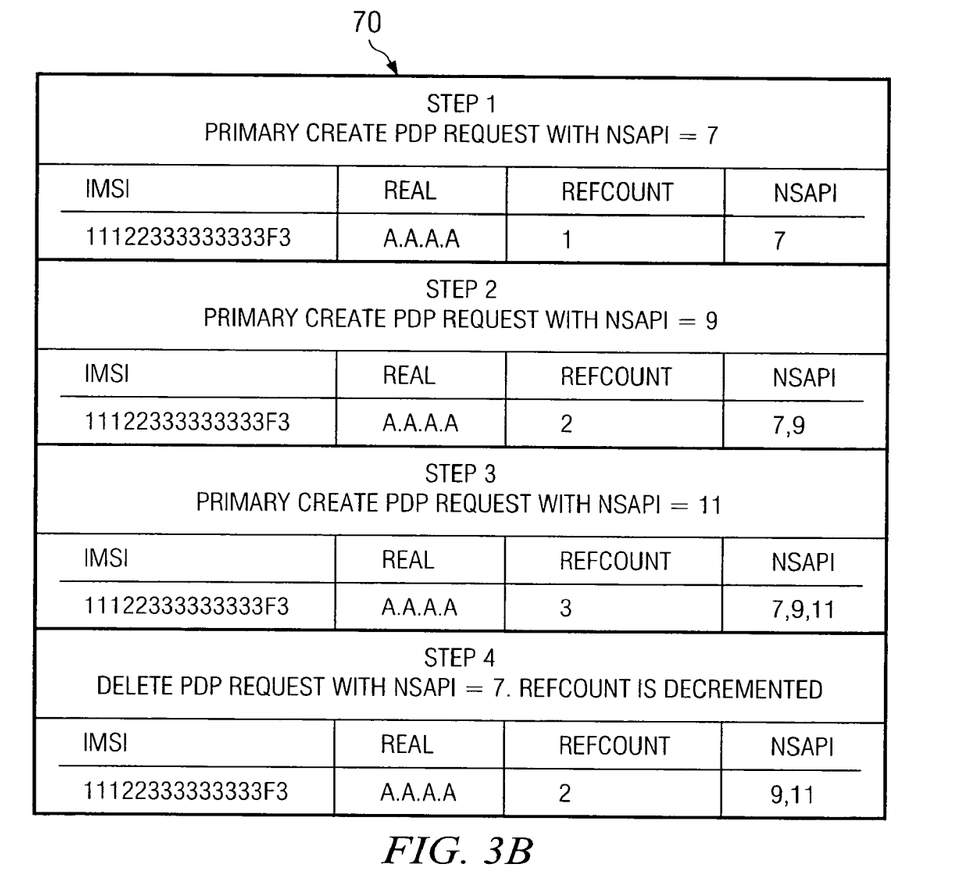
FIG. 3B is a simplified timing diagram illustrating one example interaction between multiple elements included in the communication system.

FIG. 3B is a simplified timing diagram illustrating an example interaction between multiple elements that may be included within communication system 10, which does not have the shortcomings identified above in FIG. 3A. FIG. 3B includes a session table 70 that reflects a scenario, which highlights the features of the present invention. In such a case, a loadbalancing decision is based on the IMSI. Loadbalancer 26 can extract information in the end user's layer-2 connection (IMSI) from the GTP create request and use it for making loadbalancing decisions. Additionally, loadbalancer 26 can store the decision in a persistent "sticky" table, which (for example) can be indexed by IMSI, for future use. This allows for all sessions having an identical IMSI to be forwarded to the same GGSN.

Turing to the particular operations involved in such a scenario, at Step 1 a primary create PDP request is generated with an NSAPI=7. In this example, the IMSI lookup fails, whereby a new entry is created. The loadbalancing decision is made and the session is assigned to real A.A.A.A. At Step 2, another primary create PDP request is generated with an NSAPI=9. A corresponding IMSI is found at this point. Loadbalancer 26 forwards the session to the assigned real A.A.A.A and, subsequently, the reference count (refcount) is incremented.

Note that in Steps 1 and 2, there are two create requests coming in from the same client or subscriber. The key in these instances is composed of the IMSI and the NSAPI. Note also that loadbalancer 26 is assigning these requests to the same real server IP addresses.

At Step 3, another primary create PDP request is received with an NSAPI=11. In this case, the IMSI is found and the session is forwarded to the assigned real A.A.A.A. Again, the refcount is incremented. Note that between Steps 3 and 4, the NSAPI list goes from 7, 9, 11 to 9, 11. This condition illustrates a deleted message from the GGSN, which decouples that binding. Hence, Step 4 reflects the generation of a delete PDP request with an NSAPI of 7. Here, the resources are freed up for this session and the refcount is decremented. Thus, the GGSN can provide feedback to loadbalancer 26 in deleting the sticky entry from session table 70. When the GGSN finally gives up the resources for a given IMSI, it can signal this to loadbalancer 26 such that loadbalancer 26 can clear this IMSI sticky entry. This achieves a localizing of the IMSI to a specific GGSN (in this particular case, it is A.A.A.A) in the cluster.

Some of the steps illustrated in FIG. 3B may be changed or deleted where appropriate and additional steps may also be added to the flowchart. These changes may be based on specific communication architectures or particular interfacing arrangements and configurations of associated elements and do not depart from the scope or the teachings of the present invention.

Although the present invention has been described in detail with reference to IP communications, communication system 10 may be used for any tunneling protocol involving a loadbalancing environment. The use of end user 12 and IP communications have only been offered for purposes of teaching and should not be construed to limit the scope of the present invention in any way. Thus, the present invention may be used outside GPRS and mobile environments.

In addition, communication system 10 may be extended to any scenario in which end user 12 is provided with mobility (in the context of a wired or a wireless connection or coupling) and communicates with some type of access server (e.g. a network access server (NAS), foreign agents, any other access point element, etc.). End user 12 may use a dedicated connection of some form or use forms of multiple access protocols where appropriate. Access may be associated with point-to-point protocol (PPP) or alternatively with layer three protocols over an L2 layer in accordance with particular needs. Such an embodiment may include any suitable tunnel terminators and/or tunnel initiators that may be operable to communicate with loadbalancer 26.

Additionally, loadbalancer 26 may be implemented effectively for network handoffs or handovers. Such a scenario may occur when end user 12 roams from one location to another. NSAPIs or IMSIs may be spread over multiple tunnels. Using PDP tracking provided by loadbalancer 26, the handoff may be accommodated between PDP contexts. This may be executed by creating two session objects that share an NSAPI table. Each NSAPI may belong to a different session.

Moreover, although communication system 10 has been illustrated with reference to particular elements facilitating the loadbalancing process, these elements may be replaced by any suitable architecture or configuration that achieves the intended functionality of communication system 10. Loadbalancer 26 executes loadbalancing decision based on IMSI stickying and, therefore, may receive information pertaining to such a decision via any suitable element or object. Additionally, loadbalancer 26 may execute loadbalancing decisions for any appropriate corresponding element using information provided, which is associated with an open number of PDP contexts for a given network node.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for loadbalancing in a network environment, comprising:
   a loadbalancer operable to receive a create request from an end user for a communications link provided by a network node and to communicate a response to the end user in order to establish a communication session, the loadbalancer identifying a selected one of a plurality of network nodes to facilitate the communication session, wherein the identification of the selected network node is achieved through binding of a session identifier associated with the end user to the selected network node, whereby a subsequent create request is received and correlated to the session identifier in order to forward the subsequent create request to the same selected network node, feedback information being received from the selected network node, which allows resources associated with the end user to be cleaned up, and wherein multiple flows are tracked for the end user such that when a server terminates one of the multiple flows, an explicit message is received and the tracking is updated;
   wherein the loadbalancer is further operable to bind the session identifier associated with the end user to multiple flows associated with the end user; and
   wherein the binding is accomplished by parsing a GPRS tunneling protocol (GTP) control stream and building a persistent sticky object that can be accessed by the loadbalancer.

2. The apparatus of claim 1, wherein the binding is executed based on information present in an access protocol being employed by the end user.

3. The apparatus of claim 1, wherein the loadbalancer includes a table operable to store the sticky object.

4. The apparatus of claim 1, wherein the session identifier comprises either an international mobile subscriber identity (IMSI) or a mobile subscriber ISDN number (MSISDN).

5. The apparatus of claim 1, wherein the network nodes comprise either gateway GPRS support nodes (GGSNs) or network access servers (NASs).

6. A method for loadbalancing in a network environment, comprising:
- receiving a create request from an end user for a communications link provided by a network node;
- communicating a response to the end user in order to establish a communication session; and
- identifying a selected one of a plurality of network nodes to facilitate the communication session, wherein the identification of the selected network node is achieved through binding of a session identifier associated with the end user to the selected network node, whereby a subsequent create request is received and correlated to the session identifier in order to forward the subsequent create request to the same selected network node, feedback information being received from the selected network node, which allows resources associated with the end user to be cleaned up, and wherein multiple flows are tracked for the end user such that when a server terminates one of the multiple flows, an explicit message is received and the tracking is updated;
- wherein the loadbalancer is further operable to bind the session identifier associated with the end user to multiple flows associated with the end user; and
- wherein the binding is accomplished by parsing a GPRS tunneling protocol (GTP) control stream and building a persistent sticky object that can be accessed by the loadbalancer.

7. The method of claim 6, wherein the binding is executed based on information present in an access protocol being employed by the end user.

8. The method of claim 6, further comprising: accessing a table operable to store the sticky object.

9. A system for loadbalancing in a network environment, comprising:
- means for receiving a create request from an end user for a communications link provided by a network node;
- means for communicating a response to the end user in order to establish a communication session; and
- means for identifying a selected one of a plurality of network nodes to facilitate the communication session, wherein the identification of the selected network node is achieved through binding of a session identifier associated with the end user to the selected network node, whereby a subsequent create request is received and correlated to the session identifier in order to forward the subsequent create request to the same selected network node, feedback information being received from the selected network node, which allows resources associated with the end user to be cleaned up, and wherein multiple flows are tracked for the end user such that when a server terminates one of the multiple flows, an explicit message is received and the tracking is updated;
- means for binding the session identifier associated with the end user to multiple flows associated with the end user;
- wherein the binding is accomplished by parsing a GPRS tunneling protocol (GTP) control stream and building a persistent sticky object that can be accessed by the loadbalancer.

10. The system of claim 9, wherein the binding is executed based on information present in an access protocol being employed by the end user.

11. The system of claim 9, further comprising: means for accessing a table operable to store the sticky object.

12. Software for loadbalancing in a network environment, the software being embodied in a computer readable medium and including code operable to:
- receive a create request from an end user for a communications link provided by a network node;
- communicate a response to the end user in order to establish a communication session; and
- identify a selected one of a plurality of network nodes to facilitate the communication session, wherein the identification of the selected network node is achieved through binding of a session identifier associated with the end user to the selected network node, whereby a subsequent create request is received and correlated to the session identifier in order to forward the subsequent create request to the same selected network node, feedback information being received from the selected network node, which allows resources associated with the end user to be cleaned up, and wherein multiple flows are tracked for the end user such that when a server terminates one of the multiple flows, an explicit message is received and the tracking is updated;
- wherein the code is further operable to bind the session identifier associated with the end user to multiple flows associated with the end user; and
- wherein the binding is accomplished by parsing a GPRS tunneling protocol (GTP) control stream and building a persistent sticky object that can be accessed by the loadbalancer.

13. The medium of claim 12, wherein the binding is executed based on information present in an access protocol being employed by the end user.

14. The medium of claim 12, wherein the code is further operable to: access a table operable to store the sticky object.

* * * * *